(12) United States Patent
Cromer et al.

(10) Patent No.: US 6,218,941 B1
(45) Date of Patent: *Apr. 17, 2001

(54) METHOD AND SYSTEM FOR DETECTING AN AUTHORIZED TAMPER EVENT

(75) Inventors: Daryl C. Cromer; Howard Locker, both of Cary; James P. Ward, Raleigh; Michael J. Steinmetz, Cary, all of NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,479

(22) Filed: Jul. 1, 1998

(51) Int. Cl.[7] .................................................. G08B 13/14
(52) U.S. Cl. ................................... 340/572.1; 340/568.4; 340/571; 340/572.2; 380/4; 380/25; 713/200; 713/201
(58) Field of Search ........................... 340/572.1, 571, 340/572.2, 568.4, 653, 522; 380/4, 25, 52, 3, 55; 713/151, 201, 200; 709/224, 229

(56) References Cited

U.S. PATENT DOCUMENTS

| | | | |
|---|---|---|---|
| 4,672,572 | * 6/1987 | Alsberg | 364/900 |
| 4,686,514 | * 8/1987 | Liptak, Jr. et al. | 340/571 |
| 5,341,422 | * 8/1994 | Blackledge, Jr. et al. | 380/4 |
| 5,574,786 | * 11/1996 | Dayan et al. | 380/4 |
| 5,675,321 | * 10/1997 | McBride | 340/568 |
| 5,767,771 | * 6/1998 | Lamont | 340/571 |
| 5,945,915 | * 8/1999 | Cromer et al. | 340/686.1 |
| 6,014,746 | * 1/2000 | Krehnke et al. | 713/200 |
| 6,098,171 | * 8/2000 | Johnson et al. | 713/200 |
| 6,105,136 | * 8/2000 | Cromer et al. | 713/201 |

* cited by examiner

*Primary Examiner*—Edward Lefkowitz
*Assistant Examiner*—Davetta W. Goins
(74) *Attorney, Agent, or Firm*—George E. Grosser; Joseph A. Sawyer, Jr.

(57) ABSTRACT

A system and method for monitoring tamper events in a computer system in accordance with the present invention is disclosed. The system comprises a detector means for detecting at least one tamper event and for providing an indication when the tamper event has occurred for longer than a predetermined time period. The system also includes an adapter means coupled to the detector means for receiving the indication and for disabling the computer system. The present invention is directed to a computer system, which has the ability to functionally determine if a tamper event is authorized and therefore allows the computer to operate after such an event. In a preferred embodiment, the tamper event could be as simple as a toggle switch being activated when the cover of the personal computer is removed.

7 Claims, 6 Drawing Sheets

METHOD AND SYSTEM FOR DETECTING AN AUTHORIZED TAMPER EVENT

CROSS-REFERENCE TO RELATED APPLICATIONS

The present application is related to co-pending U.S. patent application Ser. No. (RP998018), entitled "System for Detecting Tamper Events and Capturing the Time of Their Occurrence," filed on the same day and assigned to the same assignee as the present application.

FIELD OF THE INVENTION

The present invention relates to computer systems and portable computer system and more particularly, to systems for protecting such computer systems from theft or misuse.

DESCRIPTION OF RELATED ART

Personal computer systems are well known in the art. Personal computer systems have attained widespread use for providing computer power to many segments of today's modern society. Personal computers can typically be defined as a desktop, floor standing, or portable microcomputer. Examples of such personal computer systems are IBM's PC series and IBM's Thinkpad Series.

Theft of personal computers and personal computer components is becoming a major industry problem. As a result, there has been an ever increasing need to provide security for computer systems against the unauthorized removal of components and theft thereof. Since modern computer systems and components are generally more compact and more easily transportable, it is even more difficult to provide security measures that prevent unauthorized removal or theft thereof.

In addition, today, computer networks are employed to provide efficient computing capabilities throughout a large work area. Existing computer networks generally include a number of remotely located computer systems coupled via a data link to a server system or a central processing center. The wide dissemination of such systems at remote locations has made the computer systems and computer components an even more accessible target for computer thieves.

Furthermore industry standardization has increased the exchangeability or reusability of components between various types of computer systems from various vendors. The smaller form factor of components such as CPUs, memory, and DASD are popular targets, given their portability and high value. A thief could upgrade a low performance and inexpensive PC with stolen parts to create a high performance and expensive machine.

A number of methods have been developed for guarding against the unauthorized removal of computer systems. One such method is the use of Electronic Article Surveillance (EAS) tags are widely used in commercial markets for everything from clothing to Compact Disks. When an item with an EAS tag is carried through a portal, the portal sounds an audible alarm to notify security of a tamper event. The EAS tags are attached or embedded in computer systems to provide a notification of when an asset is removed.

EAS is an excellent technology for retail applications, however it is less effective for protecting assets of a corporation. Employees may have opportunities to defeat the technology such as removing the tags, passing components out though a mail service, or reusing parts within the building.

A number of other methods have been developed for guarding against the unauthorized removal of computer systems. For example, U.S. patent application Ser. No. 08/965,140 entitled "Computer System for Sending an Alert Signal Over a Network When A Cover of Said System Has Been Opened" and assigned to the assignee of the present invention discloses a mechanism to notify a system administrator within a network (typically an Ethernet network) when the cover of the computer system is removed through the use of a timestamp.

There are other methods that provide local protection (non-network based) to detect and prevent unauthorized access to the data stored in a computer system. For example, U.S. Pat. No. 5,388,156, owned by the assignee of the present invention and incorporated herein by reference, discloses a personal computer system having security features enabling control over access to data retained in such a system. The personal computer system has a normally closed enclosure and at least one erasable memory element for receiving and storing a privileged access password (PAP). The PAP is designed to provide protection for the system owner by protecting the initial program load (IPL) device boot list, access to a password utility. The system further includes at least one tamper detection switch mounted within the enclosure and operatively connected with the memory element for detecting opening of the enclosure.

In another example, in copending U.S. patent application Ser. No. RP 998018, entitled "System for Detecting Tamper Events and Capturing The Time Of Their Occurrence" and assigned to the assignee of the present application, and filed on even date herewith describes a system for detecting and storing a time of a tamper event.

Although the above-identified systems work effectively for their stated purposes, the above-described systems do not effectively address authorized tamper event because in certain instances it is not desirable to immediately disable the computer system when an authorized tamper event occurs. For example, it may not be desirable to disable the computer every time a tamper event such as opening the cover of the computer system occurs (i.e., when the computer system is serviced). As another example, if a computer system is provided on a loaner basis it may be desirable to disable the computer system only after some predetermined time period has elapsed. As a final example, the computer system may be part of a network and it may be desirable to allow the computer to be removed from the network for a predetermined time period (i.e., 24 hours or less) before disabling the computer system.

In all of the above-identified examples as well as other similar situations it would be desirable to provide the facility to allow for the computer system to continue to operate after an authorized tamper event has occurred. It is therefore desirable to provide a computer system that provides a mechanism to allow for authorized tamper events for computer systems. The mechanism should operate in conjunction with tamper detection mechanisms that are standard in many personal computer systems. The mechanism must be software and configuration independent, to protect against a thief disabling or altering the mechanism. The present invention addresses such a need.

SUMMARY OF THE INVENTION

A system and method for monitoring tamper events in a computer system in accordance with the present invention is disclosed. The system comprises a detector means for detecting at least one tamper event and for providing an indication when the tamper event has occurred for longer than a predetermined time period. The system also includes an adapter means coupled to the detector means for receiving the indication and for disabling the computer system.

The present invention is directed to a computer system, which has the ability to functionally determine if a tamper event is authorized and therefore allows the computer to operate after such an event. In a preferred embodiment, the tamper event could be as simple as a toggle switch being activated when the cover of the personal computer is removed.

DETAILED DESCRIPTION OF THE INVENTION

The present invention relates to a system and method for monitoring tamper events in a data processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
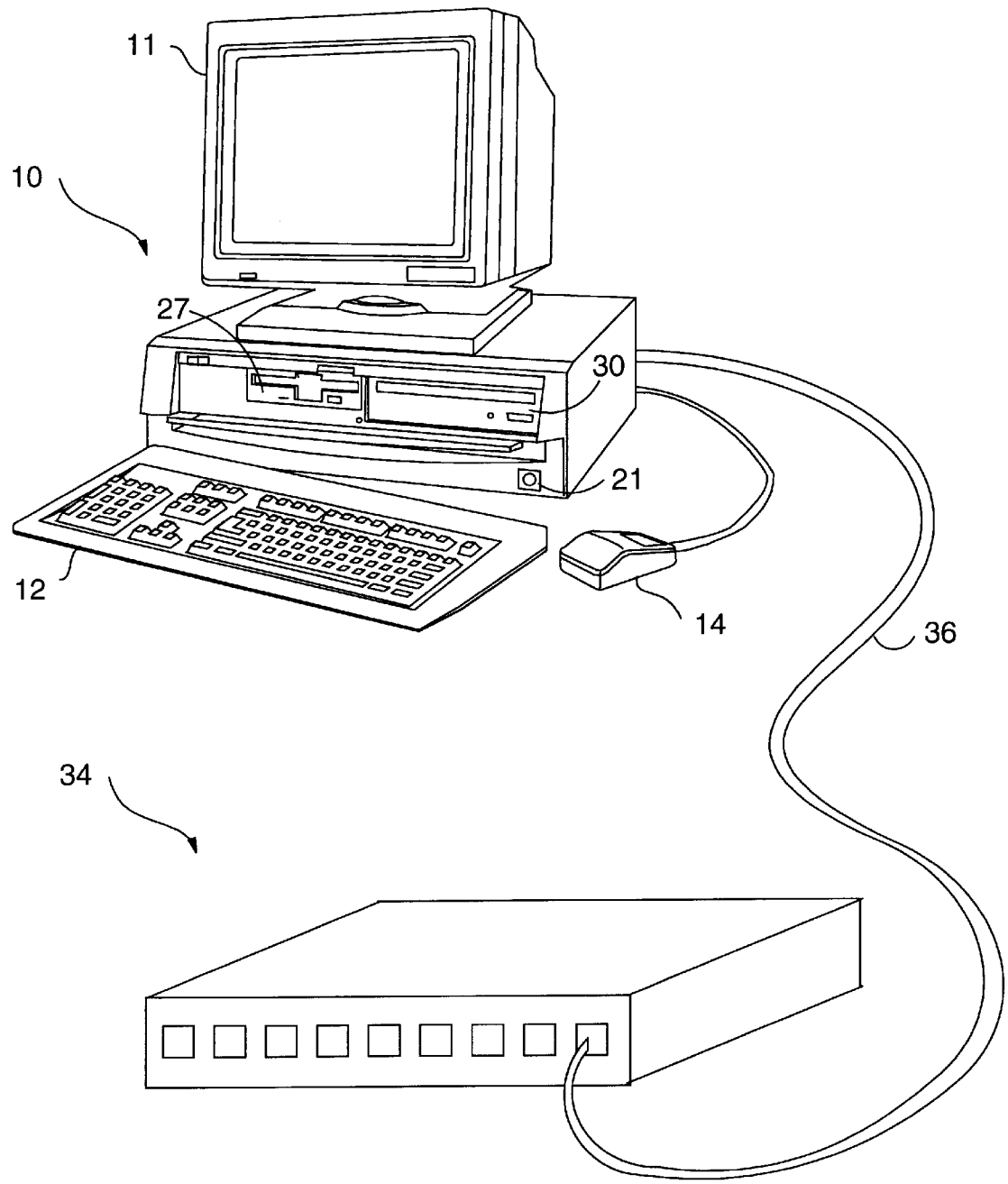
FIG. 1 is a perspective view of a personal computer embodying this invention and a LAN station remote computer system.

Referring now more particularly to the accompanying drawings, a computer system embodying the present invention is there shown and generally indicated at 10 (FIG. 1). As mentioned here in above, the computer 10 may have an associated display monitor 11, keyboard 12, mouse 14, and printer or plotter (not shown). The computer 10 is connected to a network by cable 36, which is connected to a hub 34. The network could be of type Ethernet, Token Ring, ATM, or other mechanism used to transmit data.

Figure 2:
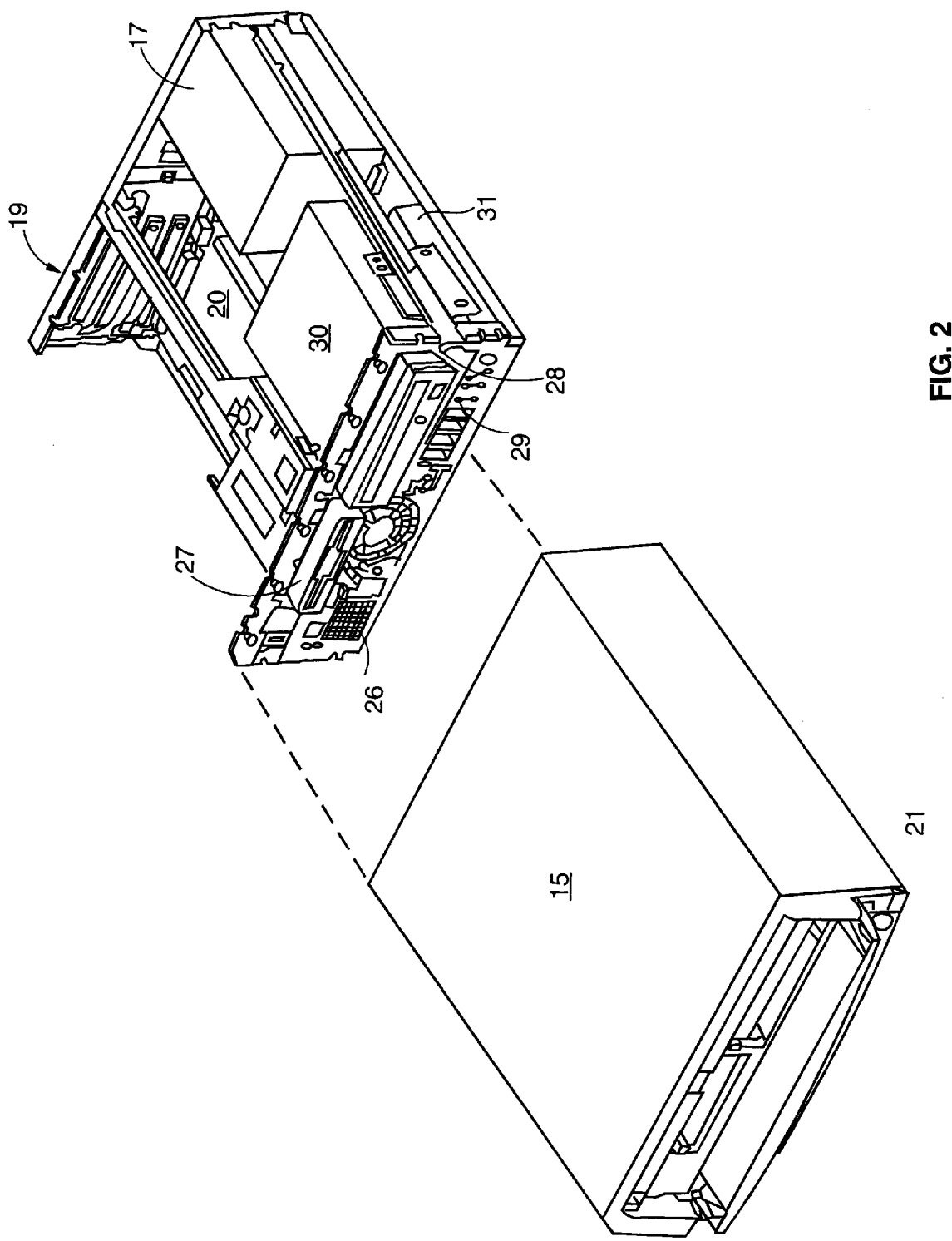
FIG. 2 is an exploded perspective view of certain elements of the personal computer of FIG. 1 including a chassis, a cover, an electromechanical direct access storage device and a planar board and illustrating certain relationships among those elements.

Now referring to FIG. 2, the computer 10 has a cover 15 which is a decorative outer member which cooperates with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

The system 10 has a power supply 17, a power button 21, also herein referred to as switch 21. In the illustrated form, the chassis 19 defines a pair of upper bays 26, 28 and a lower bay 29 are provided. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
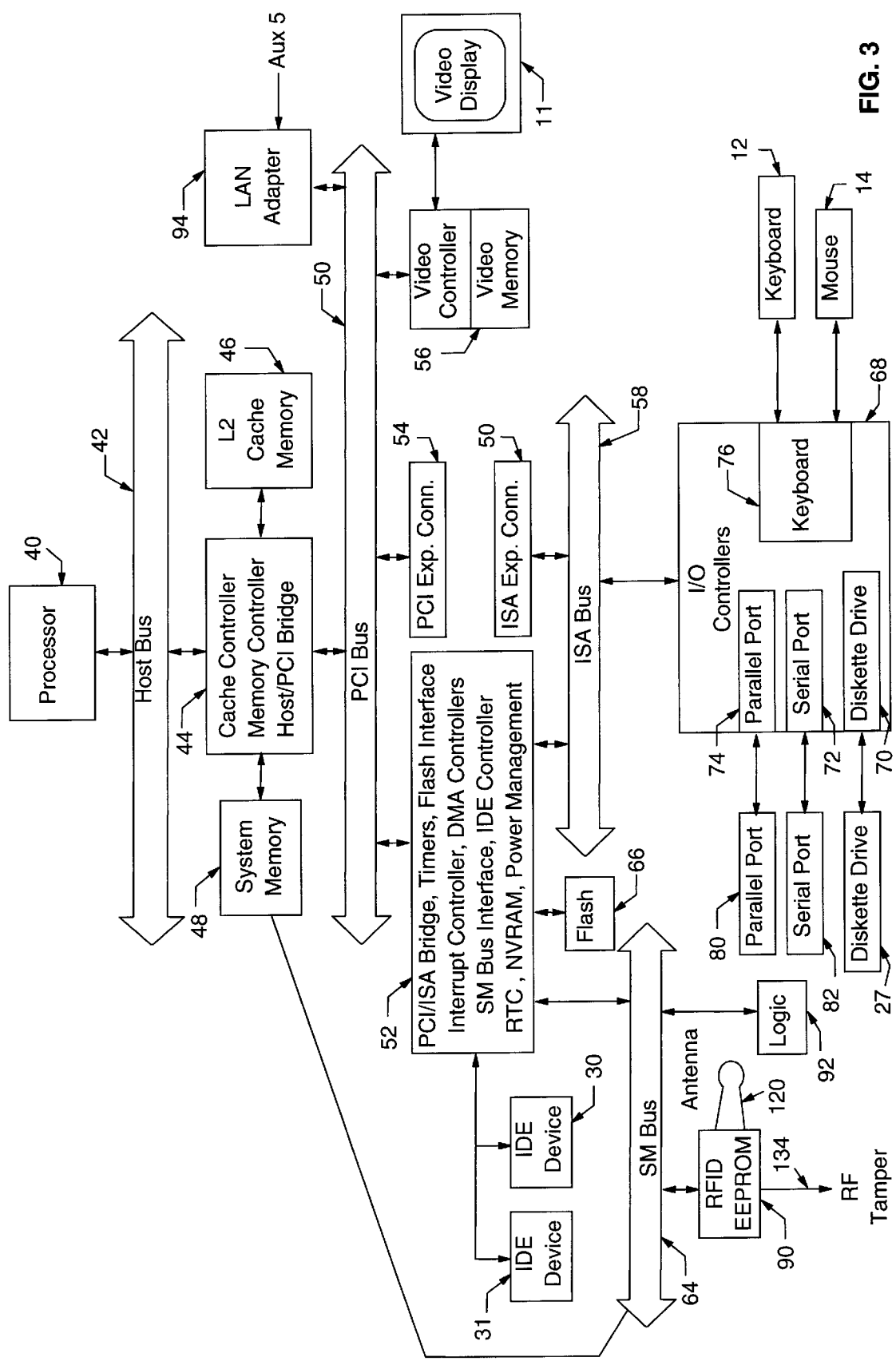
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the IO expansion connectors and other hardware of the personal computer system. Connected to the planar 20 is the system CPU or processor 40, which is connected directly to a high speed CPU host bus 42. A first system core logic chipset 44 and L2 cache memory 46 are also connected to the host bus 42. The first core logic chipset 44 includes a memory control unit, a L2 cache controller and a peripheral component interconnect (PCI) bridge. The memory control unit is further connected to a volatile random access memory (RAM) 48. The RAM memory 48 is composed of one or more memory modules. The memory controller includes the logic for mapping addresses to and from the microprocessor 40 to particular areas of RAM 48. The cache controller is operatively coupled to the L2 cache memory 46.

The first core chipset 44 can be, for example, a Triton VX chip which is sold by Intel Corporation. The PCI bridge within chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, a PIIX4 chip which is also sold by Intel Corporation.

The chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an System Management (SM) bus controller, a PCI/ISA bridge, flash memory interface, power management logic and an integrated drive electronics (IDE) controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards (not shown). The IDE controller provides for the attachment of IDE compatible storage devices such as the fixed disk drive 31 and CD-ROM drive 30.

The system real-time clock is used for time of day calculations and the NVRAM is used to store system configuration data. That is, the NVRAM will contain values which describe the present configuration of the system 10. For example, NVRAM 52 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM. Attached to core 52 is a flash memory (FM) module or chip 66.

Power management circuitry 52 is for changing the system 10 between various power states (e.g., off, standby, sleep, suspend and normal operating states). The present invention will operate in any of these power states. Accordingly, the description that follows will be independent of power state.

Coupled to the ISA bus 58 is a multi-function IO controller 68 such as, for example, a National Semiconductor PC87307. The IO controller 68 contains a variety of IO adapters and other components such as the diskette adapter 70, serial adapter 72, a parallel adapter 74 and keyboard controller 76. The diskette adapter 70 provides the interface to the diskette drive 27. The serial adapter 72 has an external port connector 82 for attachment of external devices such as a modem (not shown). The parallel adapter 74 has an external port connector 80 for attachment of external devices such as printers (not shown). The keyboard controller 76 is the interface for the keyboard 12 and the mouse 14.

A LAN adapter or subsystem 94 can be coupled to either the PCI bus 50 or the ISA bus 58 for allowing system 10 to communicate with a LAN via a connection or link 36 to hub 34 (FIG. 1). The LAN adapter is supplied with auxiliary power (AUX5) from the power supply 17 when the system 10 is off. The LAN adapter can be, for example, an IBM Alert-On LAN token ring adapter.

A planar SM Bus 64 is coupled to the PCI bus 50 and ISA bus 58 via chipset 52. The planar SM Bus 64 is an additional IO bus in system 10 and is used as a local bus to support slow speed peripheral devices that reside on the planar board. Logic 92 which will be described later is coupled to SM bus 64.

RFID (Radio Frequency Identification) EEPROM 90 is also coupled to the SM Bus 64 and an RF interface. In a preferred embodiment, the RFID EEPROM 90 is a dual ported non-volatile memory element with both a digital serial (I2C) and Radio Frequency interface. The non-volatile EEPROM includes asset information such as serial numbers and code revision for the system. The RFID EEPROM can be updated through a digital interface that connects to the SM bus 64 or through the RF interface which connects to antenna 120.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 80486 processor or any other suitable microprocessor.

The microcomputer system 10 is shown with 16 megabytes of system memory 48. It is understood that additional memory can be interconnected as represented in FIG. 3 by installing additional or higher-density memory modules. For purposes of illustration only, the present invention is described with reference to the 16 megabyte memory configuration.

Referring back to FIG. 1, there is shown the local computer system 10 along with a perspective view of some form of LAN attachment through hub 34, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer on the LAN may be some computer having capabilities other than those ascribed herein to a "personal computer", and possibly beyond those capabilities. While the term "remote" is used with reference to the computer system through which the LAN station local computer system 10 accesses BIOS, that term is used in the sense of indicating separation, rather than in the sense of indicating a large physical distance between the systems. In fact, such system may be physically adjacent in some network arrangements.

The present invention is directed to a computer system, which has the ability to functionally determine if a tamper event is authorized and therefore allows the computer to operate after such an event. In a preferred embodiment, the tamper event could be as simple as a toggle switch being activated when the cover of the personal computer is removed.

For example, the computer should not be disabled if the cover of the computer system is opened when the computer is serviced within a predetermined time period. As another example, when a computer system is provided on a loaner basis it should be provided is disabled only after some predetermined time period. As a final example, the computer system may be part of a network and it may be desirable to allow the computer system to be removed from the network for a predetermined time period (i.e., 24 hours or less) before disabling the computer system.

In a preferred embodiment of the present invention, a counter is provided which includes a timer which is set to a predetermined time period. The counter receives an indication of a tamper event on its computer. If the length of time of the tamper event is greater than a predetermined time period then the computer system is disabled. On the other hand, if the length of time of the tamper event is less than the predetermined time period then the computer can continue to operate. The counter in a preferred embodiment is powered by a system battery to eliminate requirement on AC power being present. In a preferred embodiment, the counter is setup by Power On Self Test (POST) or a network administrator. Security of the counter is limited by requiring a user to enter a Privilege Access Password (PAP) to gain access.

Figure 4:
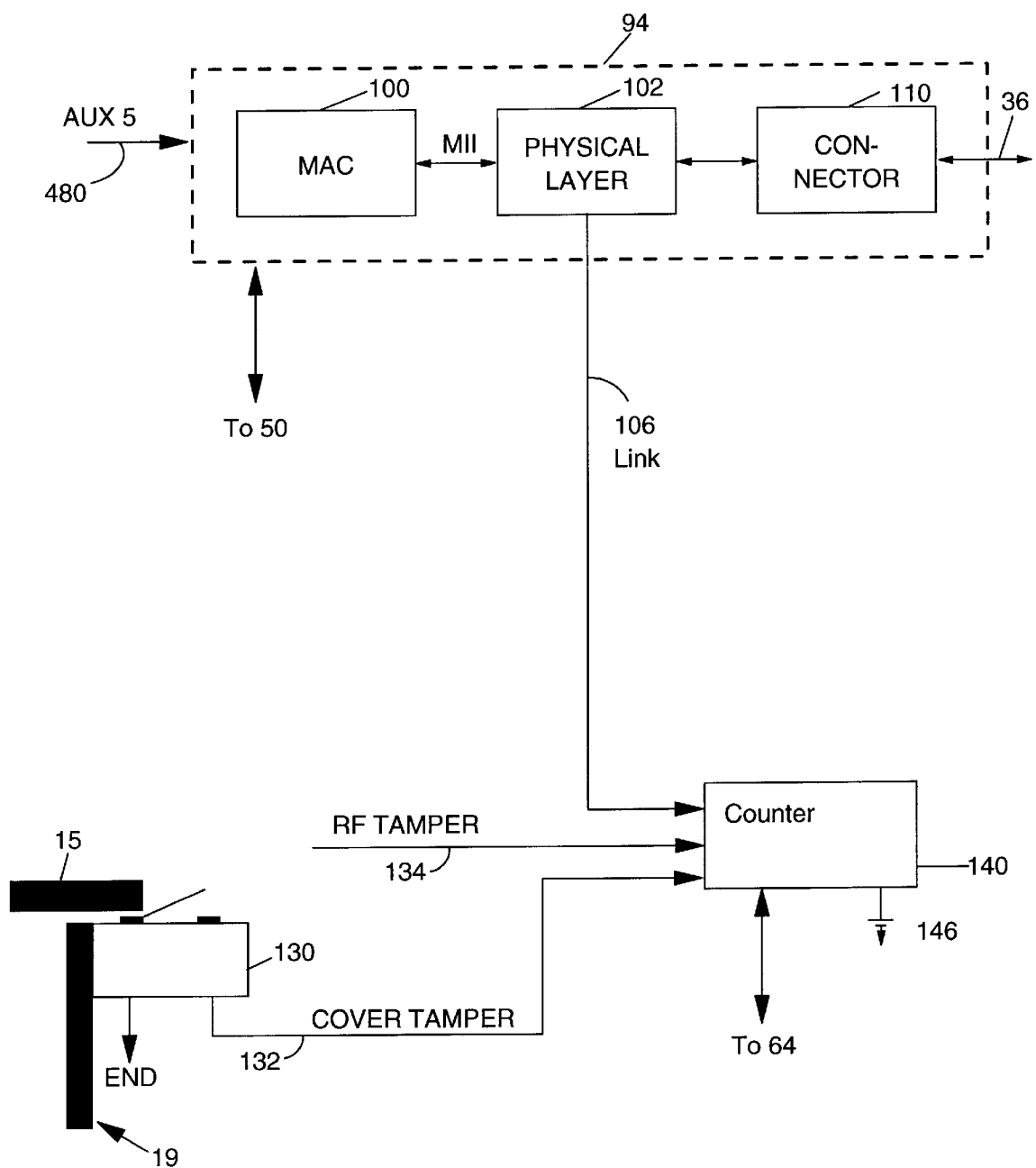
FIG. 4 is a simplified block diagram of a system in accordance with the present invention.

A preferred embodiment of the present invention will now be described with reference to FIGS. 3 and 4. FIG. 4 is a simplified block diagram of a system 90 in accordance with the present invention. The system includes a LAN adapter 94. The LAN adapter 94 includes a Media Access Controller (MAC) 100. The MAC 100 serves as an interface between a shared data path (e.g., media independent interface (MII) (described below) and a PCI bus 50 or ISA bus 58. The MAC 100 performs a number of functions involved in the transmission and reception of data packets. For example, during the transmission of data, the MAC 100 assembles the data to be transmitted into a packet with address and error detection fields. Conversely, during the reception of a packet, the MAC 100 disassembles the packet and performs address checking and error detection. In addition, the MAC 100 typically performs encoding/decoding of digital signals transmitted over the shared path and performs preamble generation/removal as well as bit transmission/reception. The MAC 100 can be for example, an Intel 82557 chip.

The LAN adapter 94 further includes a media independent interface (MII) which is a local bus between the MAC 100 and a physical layer 102. The physical layer 102 in a preferred embodiment implements a fully compliant IEEE 802.3 u MII for connection to MACs. The IEEE 802.3 u MII is a specification of signals and protocols which formalizes the interfacing of a 10/100 Mbps Ethernet Media Access Controller to the underlying physical layer 102.

The physical layer 102 in a preferred embodiment can be a fully integrated device supporting 10 and 100 Mb/s CSMA/CD Ethernet applications. The physical layer 102 receives parallel data from the MII local bus and converts it to serial data for transmission over cable 36. The physical layer 102 is also responsible for wave shaping and provides analog voltages to cable 36. The physical layer 102 can be for example, an Integrated Services Systems 1890 chip. The physical layer 102 also in a preferred embodiment includes auto-negotiation logic which has three main purposes. The first purpose is to determine the capabilities of the hub 34. A second purpose is to advertise its own capabilities to the remote computer 34. Finally, a third purpose of the physical layer 102 is to establish a connection with the remote computer 34 using the highest performance common connection technology.

The physical layer 102 also provides a LINK status signal 106 which reflects the current link status. The output of the LINK signal is low when a valid link exists between system 10 and hub 34 (e.g., Ethernet hub or bridge is established). Since auxiliary voltage (AUX5) is provided to the Ethernet subsystem (MAC 100 and physical layer 102) to support Wake On LAN (WOL), the link remains intact when the system 10 is powered off. As long as the physical connection between the system 10 and the host network is in place, the LINK signal will remain low. If the link is broken due to, for example, the cable 36 being removed, the cable 36 being cut, the cable 36 removal at the Hub or the system 10 is stolen then the link is broken and the LINK signal 106 will go high. The LINK signal 106 is coupled to the input of a counter 140.

Since the Ethernet subsystem 94 is powered off AUX 5, the mechanism will work in all power states and will always lose link when disconnected from AC power. The loss of Link is referred to as a LAN Leash Tamper event.

The LAN adapter 94 further includes a connector 110 such as a RJ45 connector which is the physical interface between the adapter 94 and cable 36. An alternative embodiment to the LAN adapter 94 could be, for example, a LAN connector or connection embedded or integrated on the planar 20. The LAN connector could also include all the same connections and components as the adapter 94. Such a connector would be referred to as LAN subsystem. The present invention is also suitable for a single chip Ethernet, token ring and ATM.

Counter 140 is programmed via the SM bus 64 to enable counter inputs and set the count down value. Programming of the counter in a preferred embodiment is handled by system power on reset timer during system initialization and is preferably operating system independent. In addition, in a preferred embodiment the programming requires use of Privilege access password (PAP) to ensure a system administrator only changes values. When one of the tamper events occurs to system 12, the counter 140 is triggered and begins the count down. If the count does not expire (i.e., indicating it is an authorized tamper event) then the computer system can continue operating. If the count has expired, a sticky latch is set in counter 140. The signal is then retrieved by the physical layer 102 via the SM bus 64 and the computer system 12 is disabled. In a preferred embodiment, counter 140 is powered by battery 146 to support operation when system is not connected to AC power.

A toggle switch 121 is coupled to chassis 19 in a manner such that when cover 15 is used to enclose the unit the toggle switch 121 is closed. When cover 15 is removed the toggle switch 121 changes position. It may not be desirable to disable the computer when the cover 15 is removed when the computer is serviced for a predetermined time period. The tamper indication by the counter 140 is provided when the cover 15 is open for a period of time that is longer than the predetermined time period.

Figure 5:
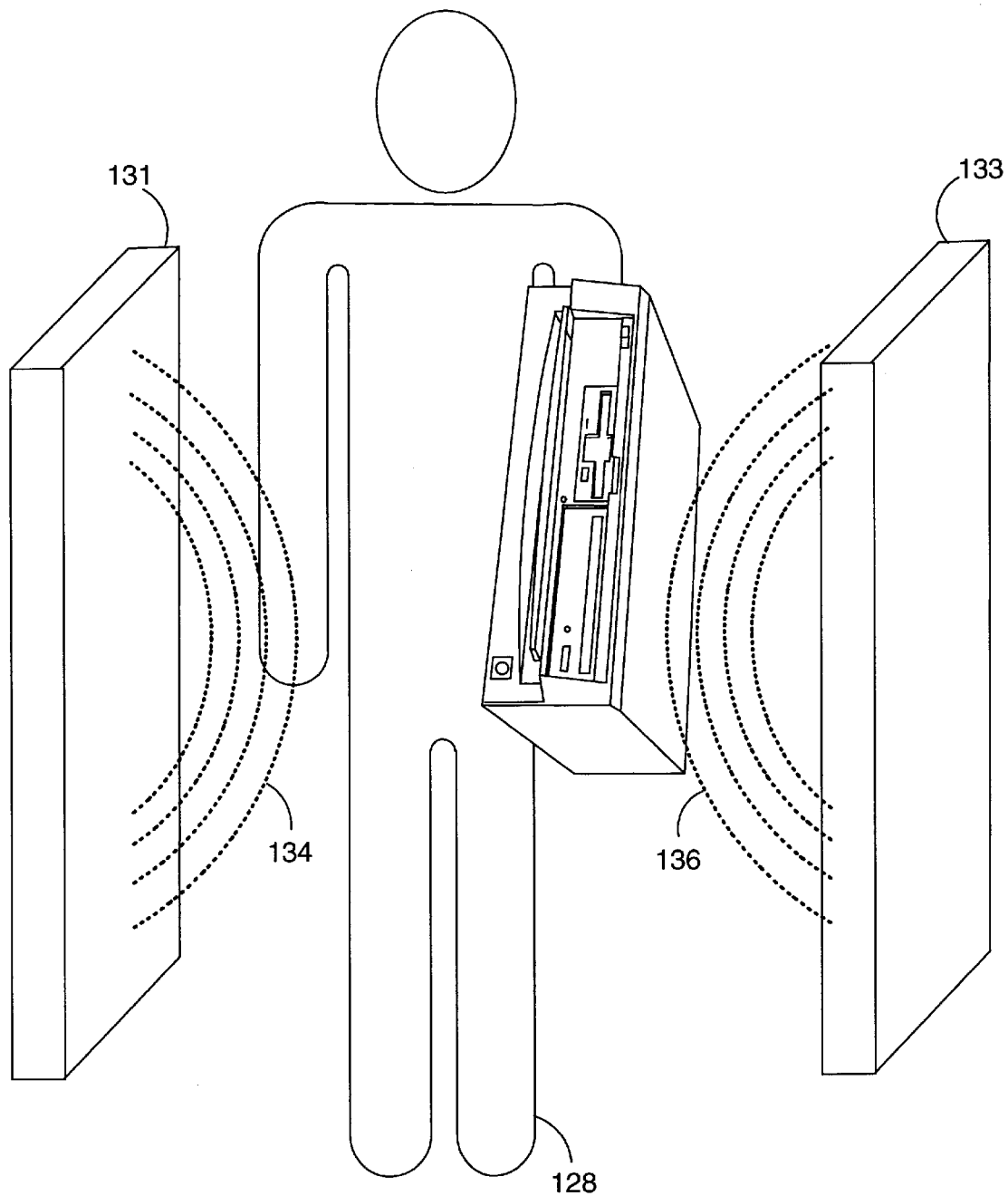
FIG. 5 illustrates a person carrying a computer system through portals of a room or building.

Now referring to FIG. 5, which illustrates a person 128 carrying machine 12 through portals 131 and 133. The portals 131 and 133 emit a continuous RF field 134 and 136. When the RFID EEPROM 90 detects the presence of the field, it sends a RF tamper signal 134 which also provided to an input of counter 140 (FIG. 4). This type of system could be utilized in a couple of scenarios. If, for example, the computer system is provided on a loaner basis, the movement of the computer through the RF fields would initiate the counter and the computer may be operable for a predetermined time period (i.e., seven days). When that predetermined time period has elapsed then the computer will be disabled.

In a second scenario, the computer could be part of a network environment in which it may be acceptable for the computer to be removed from the building. Accordingly, a LAN leash tamper event or the RF tamper event could initiate a predetermined time period (i.e., 24 hours). If the computer is disconnected from the network for more than the predetermined time period the computer would be disabled.

Figure 6:
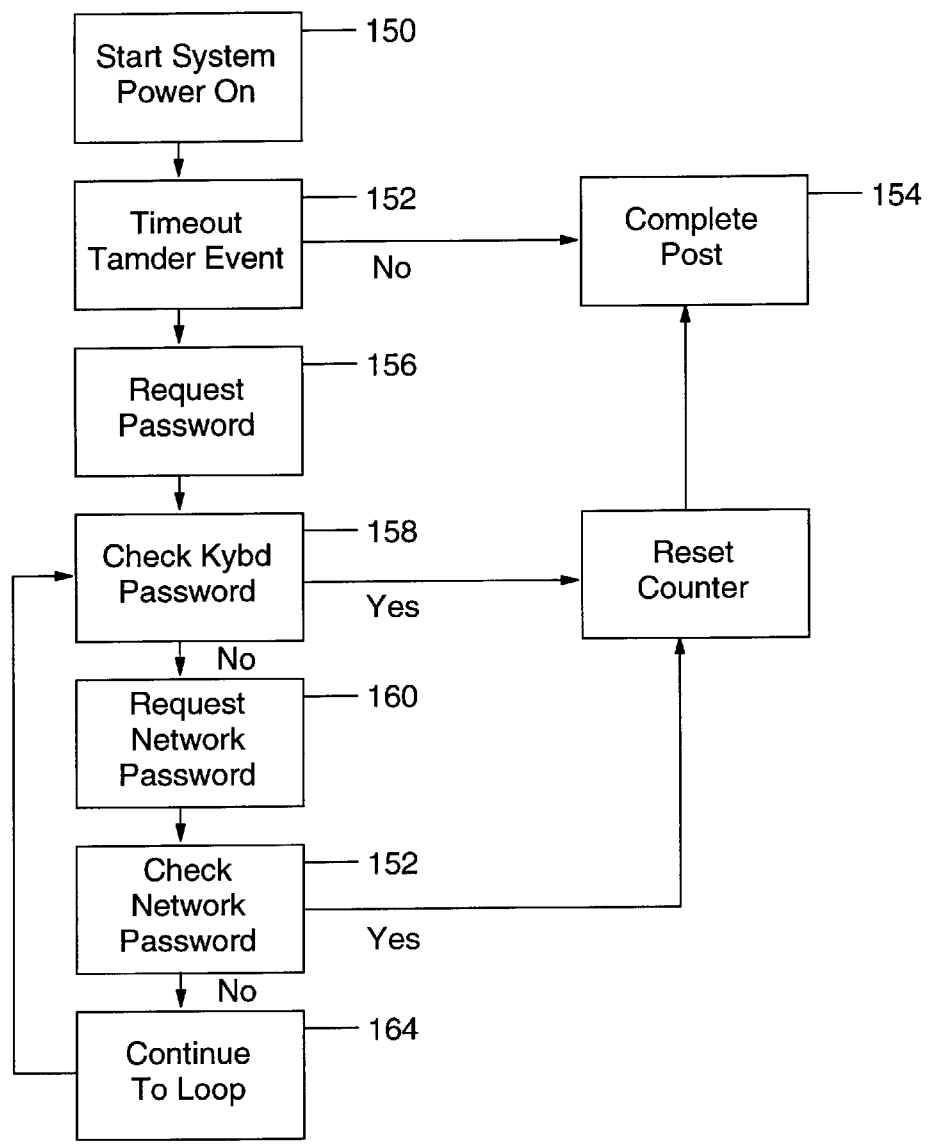
FIG. 6 is a flow diagram of operation of the system in accordance with the present invention.

FIG. 6 is a flow diagram that illustrates the operation of the system. First, the computer system 12 is turned on. POST checks counter 140 to determine if an event timeout has occurred, via step 152. If no event timeout has occurred then it completes POST, via step 154. If an event timeout has occurred then POST locks the system and displays a message indicating a need to enter a password, via step 156. POST checks for password 158 and while waiting, POST can also send a request to network requesting a token, via step 160. BIOS continues to wait for a permission to continue 164. When either method provides a valid password, BIOS then updates the counter 140, via step 166 and then completes POST, via step 154.

Accordingly, a system and method in accordance with the present invention provides a computer system, which has the ability to functionally detect whether a tamper event is authorized. In a preferred embodiment, a counter receives an indication of a tamper event signal and the physical layer disables the computer system responsive to receiving an indication that the tamper event has been longer than a predetermined time period.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for monitoring tamper events in a computer system comprising:

a counter for detecting at least one tamper event, the at least one tamper event comprising a cover tamper event, and for providing an indication when the tamper event has occurred for longer than a predetermined time period, the counter being programmed through a system bus within the computer system, wherein the programming of the counter requires use of a privileged access password to enable the computer system after a tamper event has occurred; and an adapter means coupled to the counter for receiving the indication and disabling the computer system, the adapter means comprising a physical layer and a media independent interface wherein the media independent interface comprises a specification of signals and protocols which formalizes an interfacing of an access controller to the physical layer.

2. The system of claim 1 wherein the at least one tamper event comprises a radio frequency tamper event.

3. The system of claim 1 wherein at least one tamper event comprises a LAN leash event.

4. The system of claim 1 wherein the physical layer provides a link status signal coupled to the monitor means which reflects the status of a link between the computer system and a hub.

5. A system for monitoring tamper events in a computer system, the computer system being on a network; the system comprising:

a counter for detecting at least one tamper event, the at least one tamper event comprising a cover tamper event and for providing an indication when the tamper event has occurred for longer than a predetermined time period, the counter being programmed through a system bus within the computer system, wherein the programming of the counter requires the use of a privileged access password to enable the computer system after a tamper event has occurred; and an adapter means coupled to the counter for receiving the indication and disabling the computer system, the adapter means including a physical layer, the physical layer for disabling the computer system responsive to the indication, wherein the physical layer provides a link status signal coupled to the monitor means which reflects the status of a link between the computer system and a hub.

6. The system of claim 5 wherein the at least one tamper event comprises a radio frequency tamper event.

7. The system of claim 5 wherein at least one tamper event comprises a LAN leash event.

* * * * *